United States Patent [19]

Hersee et al.

[11] Patent Number: 5,196,943
[45] Date of Patent: Mar. 23, 1993

[54] FACSIMILE INFORMATION DISTRIBUTION APPARATUS

[75] Inventors: Stephen A. Hersee, Wheaton; Terrence J. Flanagan, Bensenville, both of Ill.

[73] Assignee: Copia International, Ltd., Wheaton, Ill.

[21] Appl. No.: 398,457

[22] Filed: Aug. 25, 1989

[51] Int. Cl.⁵ .................. H04N 1/00; H04M 11/00
[52] U.S. Cl. .................... 358/403; 379/100; 358/407
[58] Field of Search ............... 358/403, 407, 440, 444; 379/100, 94; 381/43

[56] References Cited

U.S. PATENT DOCUMENTS

| | | | |
|---|---|---|---|
| 4,652,700 | 3/1987 | Matthews et al. | 379/89 |
| 4,659,876 | 4/1987 | Sullivan et al. | 379/100 |
| 4,774,590 | 9/1988 | Haganuma et al. | 358/444 |
| 4,893,333 | 1/1990 | Baran et al. | 379/100 |
| 4,908,850 | 3/1990 | Masson et al. | 379/88 |
| 4,914,704 | 4/1990 | Cole et al. | 381/43 |
| 4,918,722 | 4/1990 | Duehren et al. | 358/403 |
| 4,974,254 | 11/1990 | Perine et al. | 358/403 |
| 4,994,926 | 2/1991 | Gordon et al. | 358/400 |
| 5,008,926 | 4/1991 | Misholi | 379/89 |

Primary Examiner—Edward L. Coles, Sr.
Assistant Examiner—Thomas D. Lee
Attorney, Agent, or Firm—Marshall, O'Toole, Gerstein, Murray & Bicknell

[57] ABSTRACT

Apparatus is disclosed for distributing image data borne on a selected one of a plurality of documents in response to a data request message identifying said selected one document. The data request message is transmitted by a data requestor over a transmission medium, e.g., typical telephone lines, to the distributing apparatus. The distributing apparatus comprises an addressable memory for storing the plurality of documents. A processing circuit, e.g., a voice board, receives said data request message over the transmission medium and provides address signals corresponding to the selected one document to the memory to read out document image signals therefrom corresponding to the selected one document. A further processing circuit, e.g., a fax board, is connected to the to receive the document image signals for generating and transmitting over the transmission medium to the data requestor a return message bearing image data of the selected one document. The distributing apparatus is connected to the transmission medium by a circuit, which responds to the presence of the data request message on the transmission medium to seize the transmission medium continuously during the operation of both processing circuits, wheeby the return message may be transmitted to the data requestor over the same transmission medium as transmitted the request message to the distributing apparatus.

22 Claims, 8 Drawing Sheets

FACSIMILE INFORMATION DISTRIBUTION APPARATUS

BACKGROUND OF THE INVENTION

1. Field of the Invention

This invention relates to an information distribution apparatus accessible by a data requestor from any of a plurality of remote locations over a data transmission medium such as a conventional telephone line to access selected data stored at the information distribution apparatus and to distribute the accessed data along the same medium to the data requestor. In particular, this invention relates to the distribution of image data or documents by typical facsimile apparatus.

2. Description of the Prior Art

Much effort has gone into improving the efficiency of image data transmission, and in particular document transmission, to the data requestor. In the simplest terms, distribution of a document or, more particularly, the image borne thereby, may be broken down into a series of discrete steps. Irrespective of the data transmission medium, the requestor first formulates a data request message identifying him- or herself and the document requested. Next, that request message is sent to a depository of available documents, which, for example, could be a library or a large data base. Whether done by the use of computers or manually, the data request message is analyzed to identify the requested document, and the document is accessed and put into a form suitable for transmission back to the data requestor. In order to transmit the return message, it is necessary to identify the data requestor and where the data requestor is located and, thereafter, to transmit through the available medium the return message bearing the requested image data to the data requestor. At a relatively simple level of technology, the data requestor could either place the data request message in the form of a telephone call or a letter to the document depository, which would respond to the data request message by accessing the requested image data and transmitting the return message bearing the requested image either by telephone or by letter. Even if express mail service were used, the response time would amount to days.

As the sophistication of the technology applied increases and, in particular, as computers are applied to the problems of image distribution, the time and ease of response respectively decreases and increases. For example, facsimile apparatus may be used to transmit image data from one location to another, anywhere in the world. However, even facsimile apparatus of the prior art may be improved as to time and ease of response. The data requestor may use presently available facsimile apparatus to transmit the data request message to the document depository. That data request message must of course identify the requested information, the name and facsimile telephone number of the data requestor, and possible additional routing information. The data request message is printed out. A clerk at the document depository evaluates the request message and accesses the requested image data in files, books, or other sources of image data.

The document depository can be automated to the extent that a large volume or library of documents is stored in an addressable hard disk memory, which may be accessed or addressed by computer. The addressed document may then be printed out, taken to the facsimile apparatus, the telephone number of the data requestor entered, and a return message containing the requested image data transmitted to the data requestor. Even after the transmission of the return message has been initiated, it is necessary to monitor the complete transmission to ensure that the entire document has in fact bee transmitted. Transmission of the return message may fail for any number of reasons. The facsimile apparatus of the data requestor may be busy at the time the return message is transmitted. Even if the return message is accepted by the data requestor's facsimile apparatus, the paper may jam, the paper supply become exhausted, or there may be a disruption in the transmission medium. Since the transmission of the return message must be monitored, the image data is available to the data requestor only during normal working hours. In addition, human error, such as the request message bearing an incorrect telephone number of the requestor, must be dealt with.

Another problem arising in the distribution of documents or image data is the frequency with which image data must be updated. The problem is particularly acute when the image data is put onto hard copy, as by printing. In a large document distribution system, printed documents are distributed at various wholesaling and retailing levels. If those documents are out of date, large quantities of documents at a variety of locations have to be destroyed at considerable loss and new image data has to be reprinted and shipped throughout the distribution network. Because of the expense and time lag in printing, information reaching the data requestor is often out of date.

The prior art has also recognized the problem of audibly communicating over transmission media such as telephone lines, finding the designated recipient absent, and being unable to complete the message. U.S. Pat. No. 4,652,700 of Matthews et al. discloses a telecommunication system including a voice message system interconnecting a plurality of private exchanges via conventional telephone lines. A user at any of the plurality of private exchanges can transmit an audible message as well as a facsimile message over the telephone lines to the voice message system, whereat it is stored within the system's storage system. The transmitted facsimile message includes route identification information and information identifying a potential recipient. In order for the potential recipient to obtain that information, he/she must send a data request message over the telephone lines to the voice message system and, if there is a match between the designated and requesting recipient, the audible message and the facsimile message are sent to the requestor. The Matthews et al. system, however, is unconcerned with the problem of distributing designated documents of a library, much less teaching any manner of accessing or addressing that data in accordance with a data request message or delivering the requested data efficiently to the data requestor.

SUMMARY OF THE INVENTION

It is an object of this invention to permit any data requestor who has access to facsimile apparatus to access a document depository and immediately and automatically receive the requested document at his/her facsimile apparatus.

It is a further object of this invention to permit a data requestor to send a data request message identifying the requested document or image data, but not requiring that the request message also identify the data requestor or his/her location.

It is a still further object of this invention to permit rapid updates of information stored in a document depository and, in particular, to permit an update of the stored information from a location remote from the document depository.

It is another object of this invention to impose on the data requestor all or at least most of the costs associated with the distribution of a requested document, including the costs of the user transmission line, e.g., the telephone line, and of printing out a hard copy of the requested document.

In accordance with these and other objects of this invention, there is disclosed apparatus for distributing image data borne on a selected one of a plurality of documents in response to a data request message identifying the selected one document. The data request message is transmitted by a data requestor over a transmission medium, e.g., typical telephone lines, to the distributing apparatus. The distributing apparatus comprises an addressable memory for storing the plurality of documents. A processing circuit, e.g., a voice board, receives the data request message over the transmission medium and provides address signals corresponding to the selected one document to the memory to read out document image signals therefrom corresponding to the selected one document. A further processing circuit, e.g., a fax board, is connected to the memory to receive the document image signals for generating and transmitting over the transmission medium to the data requestor a return message bearing image data of the selected one document. The distributing apparatus is connected to the transmission medium by a circuit, which responds to the presence of the data request message on the transmission medium to seize the transmission medium continuously during the operation of both processing circuits, whereby the return message may be transmitted to the data requestor over the same transmission medium as transmitted the request message to the distributing apparatus.

In a further aspect of this invention, the memory stores message signals indicative of each of a plurality of audible messages. The voice board is responsive to a selected one of the message signals for generating and transmitting a corresponding audible message over the transmission medium to the data requestor.

In a still further aspect of this invention, the data requestor transmits messages made up of multifrequency audible tones. One processing circuit includes a circuit for receiving and converting the audible tones of the data request message into address signals to be applied to the memory to read out document signals from the memory corresponding to the selected one document. The other processing circuit is connected to the memory to receive its document signals for generating the return message comprising the image data corresponding to the selected one document. Each processing circuit comprises respectively first and second actuable switches for seizing the transmission medium. A control, illustratively in the form of a programmable computer, is responsive to a command message transmitted over the transmission medium by the data requestor indicating that the data requestor is prepared now to receive the return message for first actuating the second switch for coupling the second image data processing circuit to the transmission medium before deactuating the first switch to disconnect the first, audible data processing circuit from the transmission medium, whereby the return message may be transmitted to the data requestor over the same transmission medium over which the data request message was transmitted to the distributing apparatus.

BRIEF DESCRIPTION OF THE DRAWINGS

These and other objects and advantages will become apparent by reference to the following detailed description and accompanying drawings, in which.

DESCRIPTION OF THE PREFERRED EMBODIMENT

Figure 1:
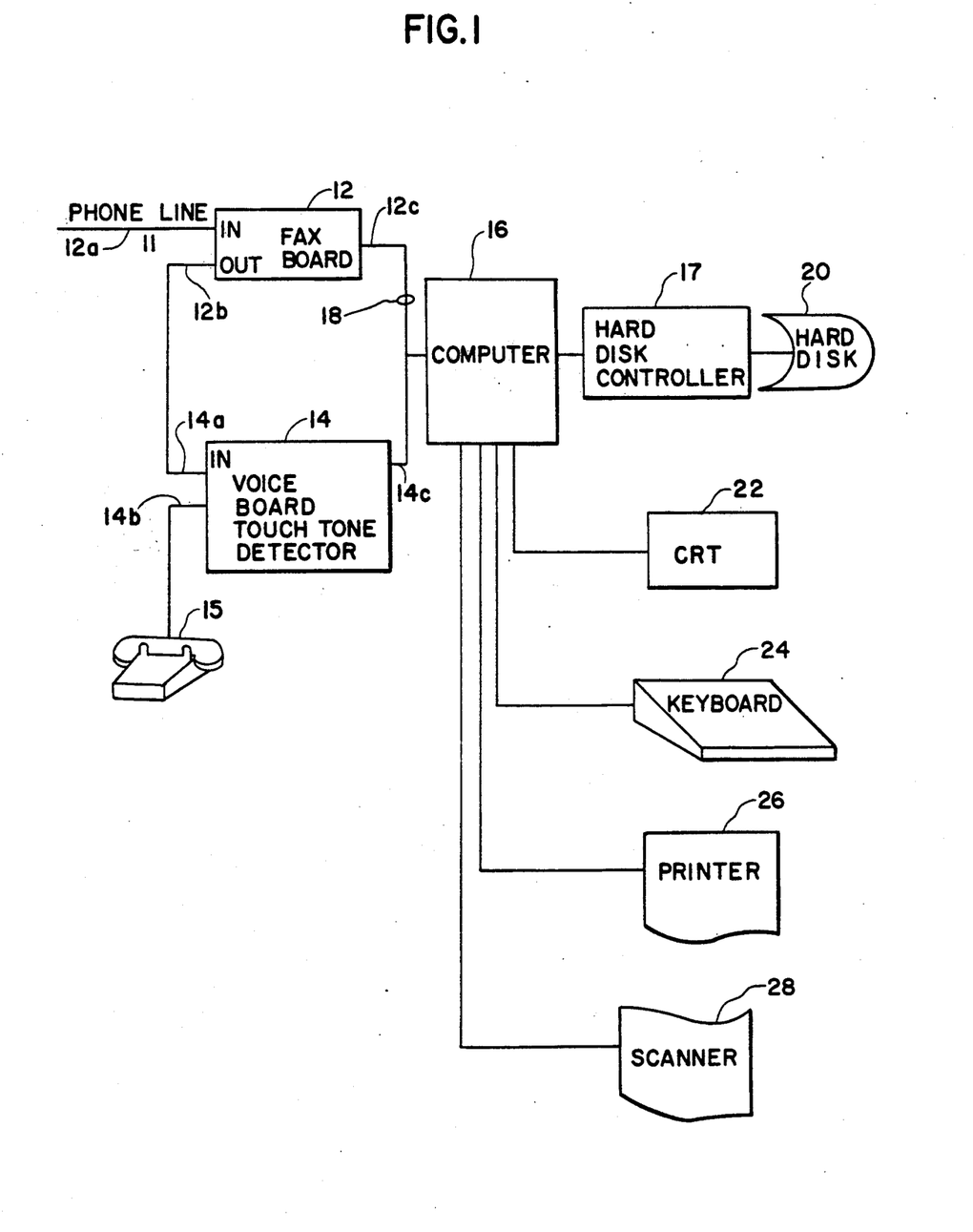
FIG. 1 is a functional block diagram of an image data distribution system in accordance with the teachings of this invention.
Figure 2A:
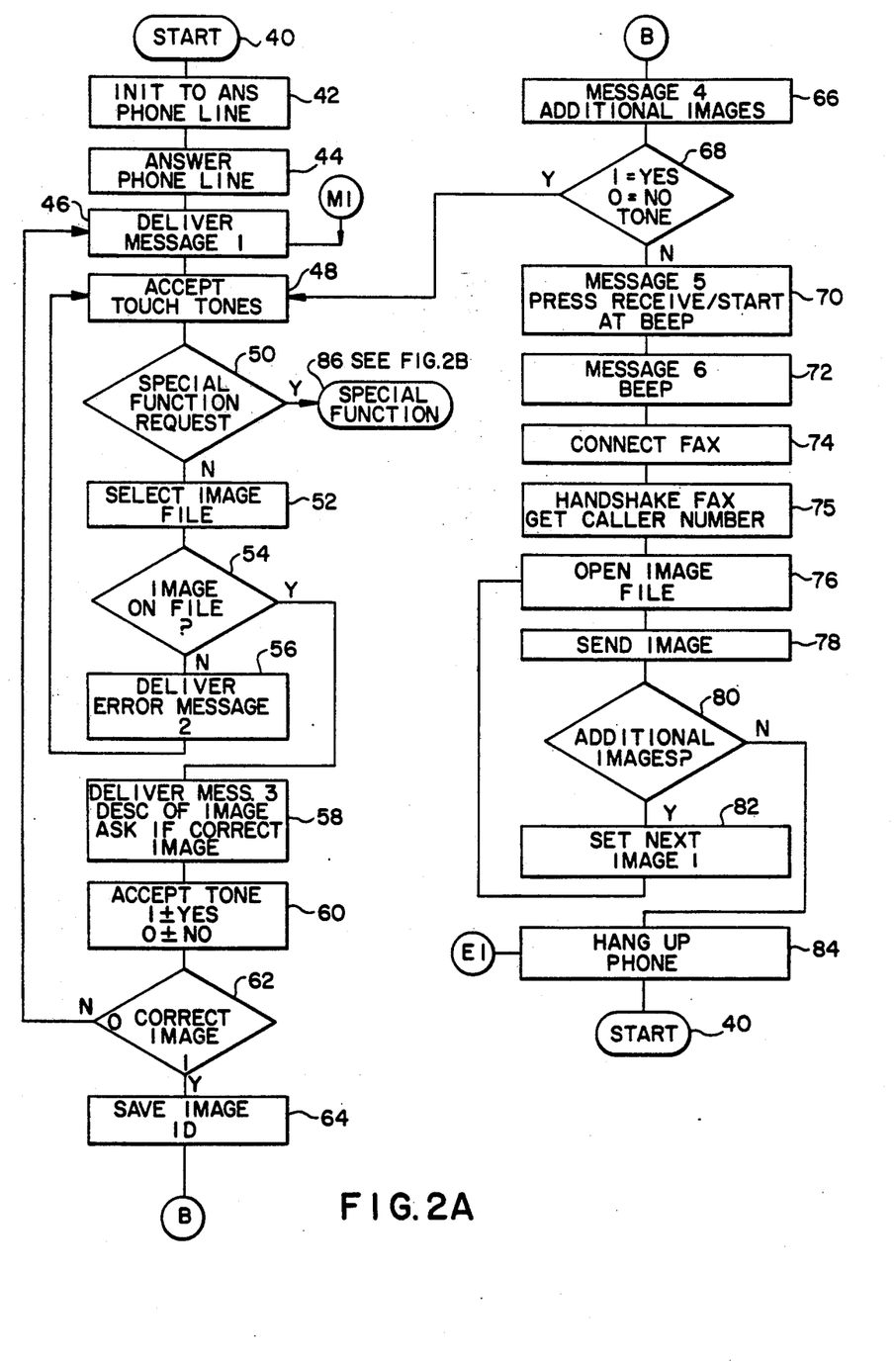
FIGS. 2A and 2B are respectively a flow diagram of a computer program for receiving and processing a data request message, whereby the requested image data or document is addressed and retrieved from an addressable memory and transmitted as a return message over the same telephone line upon which the data request message was received, and a program for permitting the update of data transmitted over a telephone line to the information distribution system of this invention.
Figure 2B:
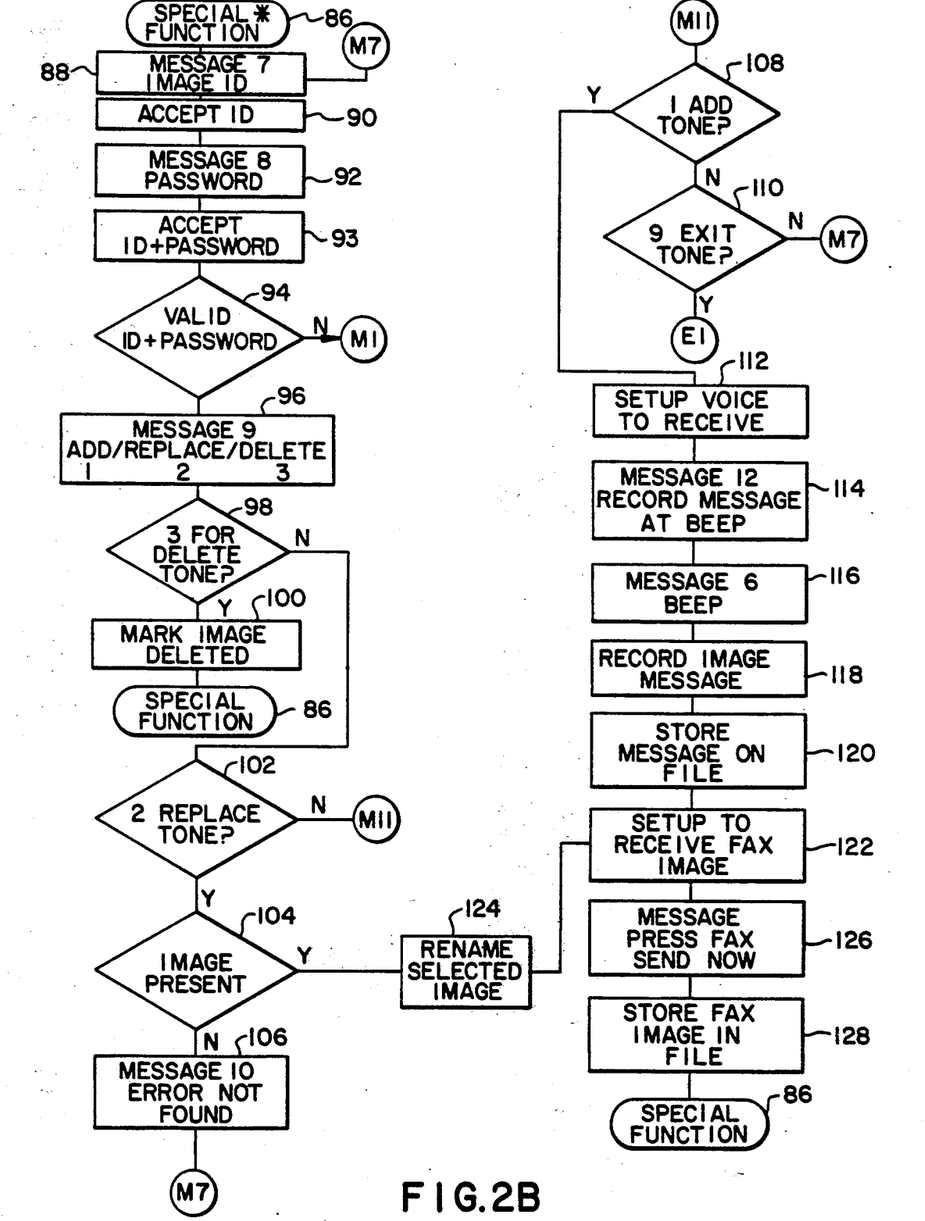

Referring now to the drawings and in particular to FIG. 1, there is shown an image data distribution system 10 for receiving a message from a data requestor over a suitable bi-directional transmission medium such as a common telephone line 11 and for applying a return message on the same telephone line 11 with the requested data, e.g., a document or image data. The transmission could also take the form of RF radio transmissions, microwave transmissions, dedicated lines and other available media. The system 10 includes a computer 16 for executing the computer programs as shown in FIGS. 2A and 2B, and illustratively taking the form of that personal computer made by IBM. The telephone line 11 is connected to the computer 16 by a facsimile board 12 compatible with the computer 16, and a voice board 14 adapted to receive and recognize the audible tones transmitted via the telephone line 11. The data requestor generates a data request message identifying the desired document in the form of audible tones by actuating a multifrequency or, as it is commonly known, a "touchtone" telephone coupled remotely to the telephone line 11. The facsimile board 12 includes a synchronous modem which has a series input 12a coupled to the telephone line 11. The facsimile board 12 is disposable in a nontransmitting state, wherein an audible message received at the input 12a is applied via an output 12b to an input 14a of the voice board 14. The facsimile board 12 has an input 12c coupled by a data bus 18 to the computer 16. As will be described below, the computer 16 addresses and applies digital signals indicative of the image data stored in a hard disk memory 20 via the data bus 18 to the facsimile board 12. The facsimile board 12 is also operative in an image transmitting state for converting those digital signals indicative of the image data or documents into a corresponding set of audible tones, which makeup a return message to be transmitted back over the same telephone line 11 to the data requestor's facsimile apparatus. In an illustrative embodiment of this invention, the fax board 12 converts the digital signals into the well known facsimile signals, i.e., the digital signals are Huffman compression coded in accordance with the CCITT Group III Document Protocol Standard. The voice board 14 is coupled via its input 14a in series with the facsimile board 12 to the telephone line 11 and also from a port 14b via the data bus 18 to the computer 16. The voice board 14 is operative in a first mode to recognize the audible tones making up the data request message and converting them into corresponding digital signals, which the computer 16 uses to address the requested document as noted in the hard disk memory 20. The voice board 14 is operative in a second mode to convert digital signals applied to its port 14b into audible messages, which pass through the facsimile board 12 and are transmitted via the telephone line 11 as a prompt to the data requestor instructing him/her to take some action. As shown in FIG. 1, a telephone 13 is coupled to the voice board 14, to permit an operator at the image data distribution system 10 to communicate with the data requestor in case of problems.

In an illustrative embodiment of this invention, the facsimile board 12 may illustratively take the form of that JT Fax board as manufactured by Hayes Modems under their model number JT Fax 96. The voice board 14 may in an illustrative embodiment of this invention take the form of that JT fax board as manufactured by Talking Technology under their designation Bigmouth Voice Board.

The computer 16 executes that program shown in FIG. 2A to actuate a hard disk control board 17 to address and to retrieve that document or image data identified in the data request message from its hard disk memory 20. Illustratively, the hard disk control board 17 is coupled to one of the slots of the computer 16, whereby address signals are applied to the board 17. In an illustrative embodiment of this invention, the board 17 may comprise that memory control board as manufactured by Seagate Tech under their designation Hard Disk Controller and is particularly adapted to control that illustrative embodiment of the hard disk memory 20 as manufactured by Seagate Tech under their designation ST-251. The computer 16 is also coupled to a suitable display device, such as a CRT 22. The computer 16 is also coupled to a keyboard 24 and a printer 26. The keyboard 24 permits the operator to enter desired commands into the computer 16. The computer 16 is also coupled to a scanner 28, whereby document data may be scanned or read off documents read by the scanner 28 to be stored in the hard disk memory 20. For example, the operator may actuate suitable keys of the keyboard 24 to print out a log file of the data requestors that have used the data distribution system 10. The scanner 28 is operated under the control of corresponding software installed in the computer 16, to scan documents and store the scanned image data onto designated areas of the hard disk memory 20. In an illustrative embodiment of this invention, the scanner 28 and its associated program stored in the computer RAM, is that scanner as manufactured by Hewlett Packard under the name "ScanJet".

Referring now to FIG. 2A, there is shown a flow diagram of that program executed by the computer 16. Generally, the program of FIG. 2A is executed to audibly prompt the data requestor to send his/her data request message, process the data request message to determine what document or image data is being requested, address and retrieve the requested image data from the hard disk memory 20, and then transmit a return message containing the requested image data over the same telephone line 11 that the data requestor used to transmit his/her data request message. After entering through step 40, step 42 initializes various parts of the image data distribution system 10. In particular, the various audible prompt or error messages to be transmitted to the data requestor, are loaded into a RAM associated with the computer 16. In addition, the facsimile board 12 shown in FIG. 1 is disposed to its nontransmitting state, whereby the telephone line 11 is directly coupled to the input 14a of the voice board 14. Next, step 44 loops, waiting for a telephone call from a data requestor to be placed over the telephone line 11 to the image data distribution system 10. The data request message is applied to the voice board 14, which senses a "ring signal" associated with the message to set a ring register within the RAM of the computer 16. Step 44 applies a control signal via the data bus 18 to actuate the voice board 14, whereby the incoming data request message is received. Next, step 46 addresses a "welcome" message in the RAM, which is read out and is applied as a set of digital signals via the data bus 18 to the voice board 14. In response, the voice board 14 converts the digital signal into an audible prompt, which is transmitted via the telephone line 11 to the telephone of the data requestor. The "welcome" message assures the data requestor that he/she has reached the image data distribution system 10 and, further, prompts the data requestor to formulate his/her data request message by actuating the "touchtone" buttons of the telephone associated with the facsimile apparatus of the data requestor. Next, step 48 actuates the voice board 14 to receive and to convert the audible "touchtone" signals into corresponding digital signals, which are applied via the data bus 18 to the computer 16.

Next, step 50 examines the data request message to determine whether a special function has been requested. For example, the data requestor may specify a special function by striking the star button of his/her telephone. If a special function has been requested, the program jumps to the special function subroutine 86, which will be shown and described with respect to FIG. 2B. Each document or image data contained within the hard disk memory 20 has a name. If the special function has not been requested, step 52 processes the data request message received through the voice board 14 to formulate the name of the requested image data and set up a file within the RAM of the computer 16, identified by that name. Next, the computer 16 compares the requested file name as formulated in step 54 with the file of names of corresponding image data that are actually stored in the hard disk memory 20. If a requested document is not available, step 54 moves to step 56, which actuates the voice board 14 to deliver an audible message over the telephone line 11 to the data requestor to explain that the requested document is not available within the image data distribution system 10. Thereafter, the program returns to step 48, whereby the data requestor is given the opportunity to transmit another data request message. However, if the requested image data is in the hard disk memory 20, the program moves to step 58, which actuates the hard disk control board 17 to address the hard disk memory 20 to read out the document identified by the data request message.

Figure 3:
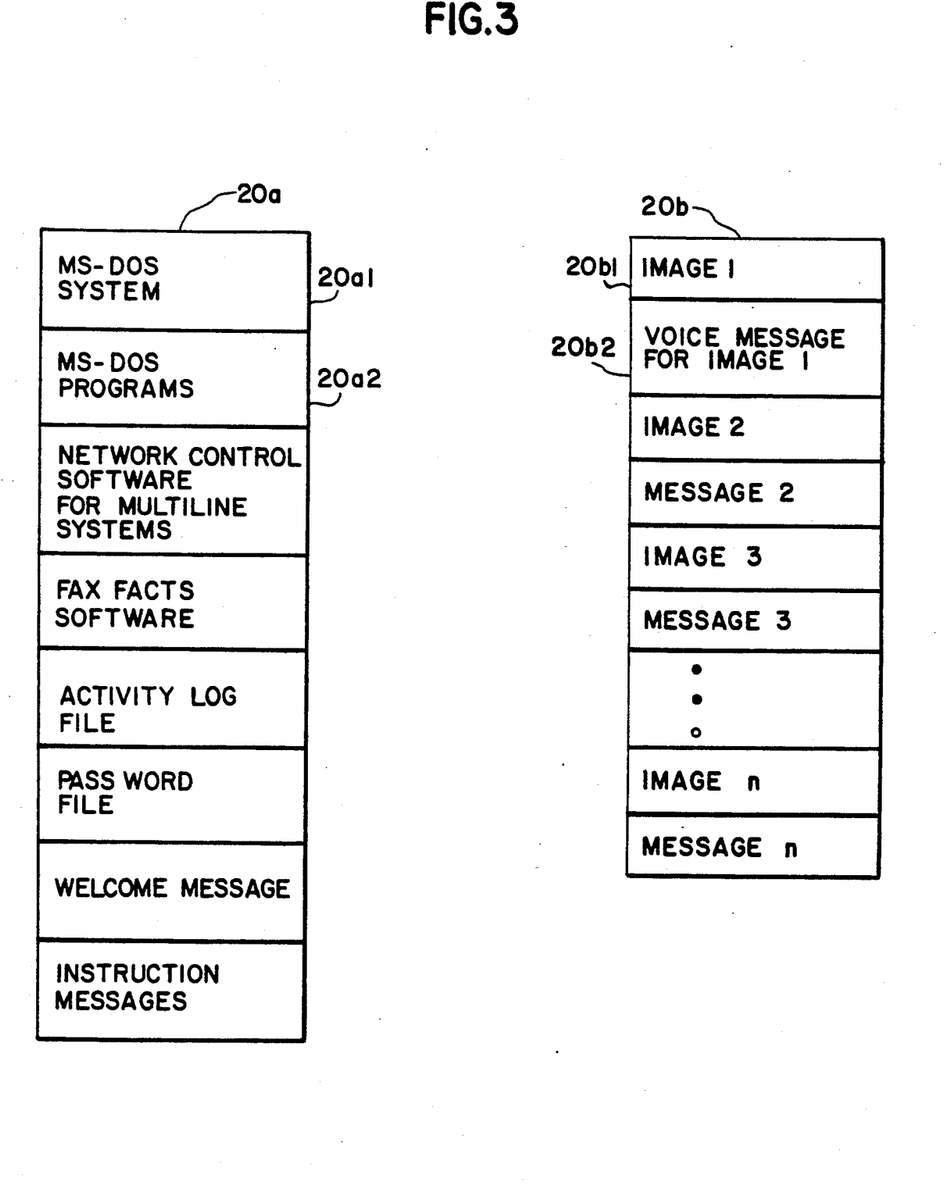
FIG. 3 is a map of the contents of the addressable hard disk memory incorporated within the image data distribution system shown in FIG. 1.

FIG. 3 illustrates the stored contents of the hard disk memory 20. Each image data or document 1 through n stored in the memory 20, has digital signals for generating an associated voice message identifying the image data. These digital signals are applied via the data bus 18 to the voice board 14, which converts the received digital signals into an audible message identifying the name and nature of the requested information and transmits it via the telephone line 11 to the data requestor. The audible message also prompts the data requestor to verify whether the identified document is correct or not by actuating after the "beep" a "one" on his/her telephone if correct, or a "zero" if incorrect. Next, step 60 actuates the voice board 14 to generate an accept tone, which provides a prompt to the data requestor to hit the "zero" or "one" button of his/her "touchtone" telephone. Next, step 62 examines the response to determine whether it is a "one" or a "zero". If a "zero" indicating that the wrong data was requested, the program returns to step 46 to loop through the program to again ask the data requestor for a new data request message. However, if the voice board 14 recognizes a "one", indicating that the correct message was transmitted, the program moves to step 64, which saves the name or ID of the requested document in a designated area of the computer's RAM. As additional messages are requested and verified, this RAM area forms a list of requested documents or data images, as will be explained below.

Next, step 66 accesses digital signals from the computer's RAM to be applied to the voice board 14, which converts and transmits them over the telephone line 11 as an audible prompt requesting the data requestor to indicate respectively, by pressing either the "one" key or the "zero" key on the data requestor's telephone, whether or not the data requestor intends to request further image data. The message instructs the data requestor to press the desired "touchtone" button. Next, step 68 examines the received "touchtone" signals and, if a "zero" indicating that no further message will be requested, the program continues as shown in FIG. 2A to access the requested image data in the hard disk memory 20 and to transmit the requested image data to the data requestor. However, if the received "touchtone" signal is a "one", indicating that the data requestor will request further documents or image data, the program returns to step 48 and, thereafter, steps 48-64 are repeated as long as further image data requests are made by the data requestor.

After all of the requests for image data have been entered as decided in step 68, the program moves to step 70, which reads out message data from the computer's RAM and applies it to the voice board 14, which converts and transmits it as an audible prompt via the telephone line 11 to the data requestor's telephone to press the "receive" or "start" button on his/her facsimile apparatus after the beep generated by step 72. Next, step 74 responds to the transmission of a "touchtone" response over the telephone line 11 indicating that the start/receive button has been pushed within a timed period, to transmit a first signal over the data bus 18 to actuate the facsimile board 12 to seize the telephone line 11, and thereafter, to transmit a second signal to deactuate the voice board 14. Next, step 75 effects a standard handshaking operation between the facsimile board 12 of the image data distribution system 10 and the facsimile apparatus of the data requestor, whereby the two are coupled over the interconnecting telephone line 11. As part of that handshaking operation, the telephone number of the data requestor's facsimile apparatus is obtained and stored in a suitable location within the computer's RAM. Significantly, the facsimile board 12 seizes the same telephone line 11 which was previously coupled to the voice board 14. In this manner, the image data distribution system 10 may first couple its voice board 14 to the telephone line to permit the transmission of audible prompts to the data requestor and then to receive and interpret a data request message comprising a series of the "touchtone" signals. Next, in the process of distributing image data, step 74 controls the facsimile board 12 to seize the same telephone line 11, whereby the requested document or data image may be transmitted without the necessity of the image data distribution system 10 placing a new telephone call to the data requestor, or even knowing who the data requestor is!

After the facsimile board 12 has been actuated to transmit the requested image data and the image data distribution system 10 has been coupled via the telephone line 11 to the data requestor's facsimile apparatus, step 76 establishes an image file in the computer's RAM for receiving a discrete portion or page of the image data to be transmitted from the hard disk memory 20. It is understood that the image data cannot be transmitted directly from the hard disk memory 20 to the facsimile board 12. The facsimile board 12 transmits the requested image data to the data requestor at a variable baud rate recognized during the handshaking between the facsimile board 12 and a similar module within the data requestor's facsimile apparatus. First, the image data is accessed and read from the hard disk memory 20 at a fixed rate and is stored within a discrete portion, i.e. a buffer, of the computer's RAM; thereafter the image data is read out and transmitted at the ascertained baud rate via the facsimile board 12 to the facsimile apparatus of the data requestor. Next, step 78 transfers one page of image data from the computer RAM via the data bus 18 to the facsimile board 12, which converts the digital image data to an audible return message capable of being transmitted over the telephone line 11 to the requestor's facsimile apparatus, whereat the transmitted message is reconverted in accordance with the well-known facsimile process into the requested document or documents. The page process continues until all of the requested document or documents is transmitted, one page at a time, in this fashion.

After each document has been transmitted, step 80 examines that RAM location where the list of requested documents is stored, to see if there are further images that have been requested. If not, the program moves to step 84, which instructs the facsimile board 12 to open the switch connecting it to the telephone line 11, thereby terminating the telephone connection. Then, step 84 transmits via the hard disk control board 15 to a dedicated file in the hard disk memory 20, a list of the transmitted documents and the telephone number of that data requestor. However, if there are additional images to be transmitted as decided in step 80, then step 82 searches that area of RAM in which the requested messages are listed to identify the next document name in that file, before moving to step 76, which again addresses the next document in the hard disk memory 20 to be transmitted.

The special function 86, generally shown in FIG. 2A, permits in one illustrative embodiment of this invention documents stored in the hard disk memory 20 to be updated from a remote location. As image data is updated, it is necessary to quickly place the most current version of that image data into the hard disk memory 20. If image data is available at the image data distribution system 10, the scanner 28 is capable of scanning and converting that image data into digital signals, which are then stored in the hard disk memory 20. However, the image data distribution system 10 is also adapted to make changes in the image data stored in the hard disk memory 20 from a remote location. As will be explained, the image data distribution system 10 is capable of receiving from a remote location a special function instruction to receive over the telephone line 11 and place new or altered image data in the hard disk memory 20. If a special function has been requested as detected by the step 50, the program moves to the special function program 86, which is more fully showing FIG. 2B.

After the program has moved to the special function program 86, step 88 accesses certain digital data in the computer's RAM and conveys it via the data bus 18 to the voice board 18, which transmits over the telephone line 11 an audible prompt for the user to enter via his/her "touchtone" telephone the ID or name of the image data or document to be changed. Next, step 90 loops until each of the "touchtone" sounds of the document name to be changed, is accepted. Next, step 92 generates by use of the voice board 14 an audible prompt for the user to enter via his/her "touchtone" a password, which permits entry into the hard disk memory 20. Next, step 93 loops until each of the "touchtone" sounds defining the password entered by the data requestor is received and placed into a buffer of the computer's RAM. Next, step 94 compares each of the ID or name of the image data requested and the password of the data requestor respectively with the list of available documents and passwords of the authorized users. If either of the entered document ID or user password is not recognized as determined in step 94, the program jumps to step 46, as shown in FIG. 2A, wherein the user is prompted to enter the ID of the next requested document.

However, if step 94 recognizes both the document ID and the user password as valid, the program moves to step 96, which generates and transmits an audible prompt to the user to actuate a corresponding "touchtone" button to indicate whether the user wishes to add (the 1 "touchtone" button), to replace (the 2 "touchtone" button), or to delete (the 3 "touchtone" button) the requested document. The user actuates a corresponding button, and the appropriate "touchtone" sounds are transmitted to the image data distribution system 10, where they are recognized by the voice board 14. Next, step 98 determines whether the 3 "touchtone" button was actuated and, if so, the name or ID of the document to be deleted is placed into a dedicated area of the computer's RAM. It is contemplated that the document to be deleted could actually be removed at this time from the hard disk memory 20. However, if that document were erased and a later decision was made not to delete the document, there would be no way for the image document distribution system 10 to recover the erased document. Instead, in a preferred embodiment of this invention, the document to be deleted is identified in a list and, at a later time, all documents within that list are deleted. In effect, this permits the user to rethink the decision to delete a document, before any data is actually erased. After the name of the document to be deleted is entered in the file by step 100, the program returns through M7 to step 88, where the user is prompted to enter the name of the next document to be changed.

If the user has not requested to delete a document as decided in step 98, the program moves as shown in FIG. 2B to step 102, which determines whether the user has actuated the 2 "touchtone" button indicating that the named document is to be replaced. If the document is to be replaced as decided by step 102, then step 104 seeks a match between the accepted name of the document to be changed with that RAM file of document names stored in the hard disk memory 20. If the named document is not available in the hard disk memory 20, then step 102 generates and transmits an audible prompt to the user indicating that the entered document name is not available, before returning to step 88, which again requests the user to enter the name of the next document to be changed.

If step 102 decides that neither the 3 nor 2 "touchtone" button has been actuated by the user, the program moves to step 108, which determines whether the 1 "touchtone" button was actuated. If not, step 110 determines whether the user has actuated the 9 "touchtone" button indicating a command to exit the special function program. If no as decided by step 110, the program returns to step 88, which generates an audible prompt to request the user to enter the name of the next document. If yes, and it is desired to end this transaction, the program returns to step 84 as shown in FIG. 2A, whereby the interconnection between the image data distribution system 10 and the remote facsimile apparatus of the user is disconnected.

If it is desired to store a further document in the hard disk memory 20 as decided in step 108, the program moves to step 112, which actuates the facsimile board 12 to its nontransmitting state, whereby the telephone line 11 is coupled directly to the input 14a of the voice board 14. Then, the voice board 14 receives and converts an audible message from the user identifying and describing the new document to be stored in the hard disk memory 20; it is appreciated that each document stored in the hard disk memory 20 has a corresponding audible message, which is read out to a potential data requestor to audibly describe that document. Next, step 114 generates an audible prompt to the user to start dictating the associated audible message after the sound of the "beep". Next, step 116 generates the "beep", before step 118 receives the user's audible message, which the voice board 14 converts into digital signals to be stored in a buffer area of the computer's RAM. Next, step 120 transfers the identifying voice message into a designated area of the hard disk memory 20 to be accessed by data requestors.

Next, step 122 actuates the facsimile board 12 to its image transmitting state in preparation for receiving the new document to be added over the telephone line 11. Next, step 126 generates and transmits an audible prompt to the user to actuate the "send" button on his/her facsimile apparatus. Then, step 128 receives from the facsimile board 12 the digital signals representing the new document and stores the new document in a corresponding file of the hard disk memory 20, before the program returns to step 88 to request the user to enter the name of the next document to be changed.

If step 104 indicates that the user instruction is to revise a named document and that named document is present in the hard disk memory 20, the program moves to step 124, which renames the present document as being a previous or older version, and sets up a new file in the hard disk memory 20 for the revised document to be faxed to the image data distribution system 10. Next, the program moves to step 122, as previously described. Briefly, step 122 actuates the facsimile board 12 to its receive state in order to receive the revised document from the user's facsimile apparatus over the telephone line 11. Next, step 126 prompts the user to transmit the revised document, before step 128 transfers the digital signals outputted by the facsimile board 12 to its newly designated file of the hard disk memory 20. Finally, the program returns to step 88, wherein the user is prompted to identify the name of the next document to be changed.

Figure 4A:
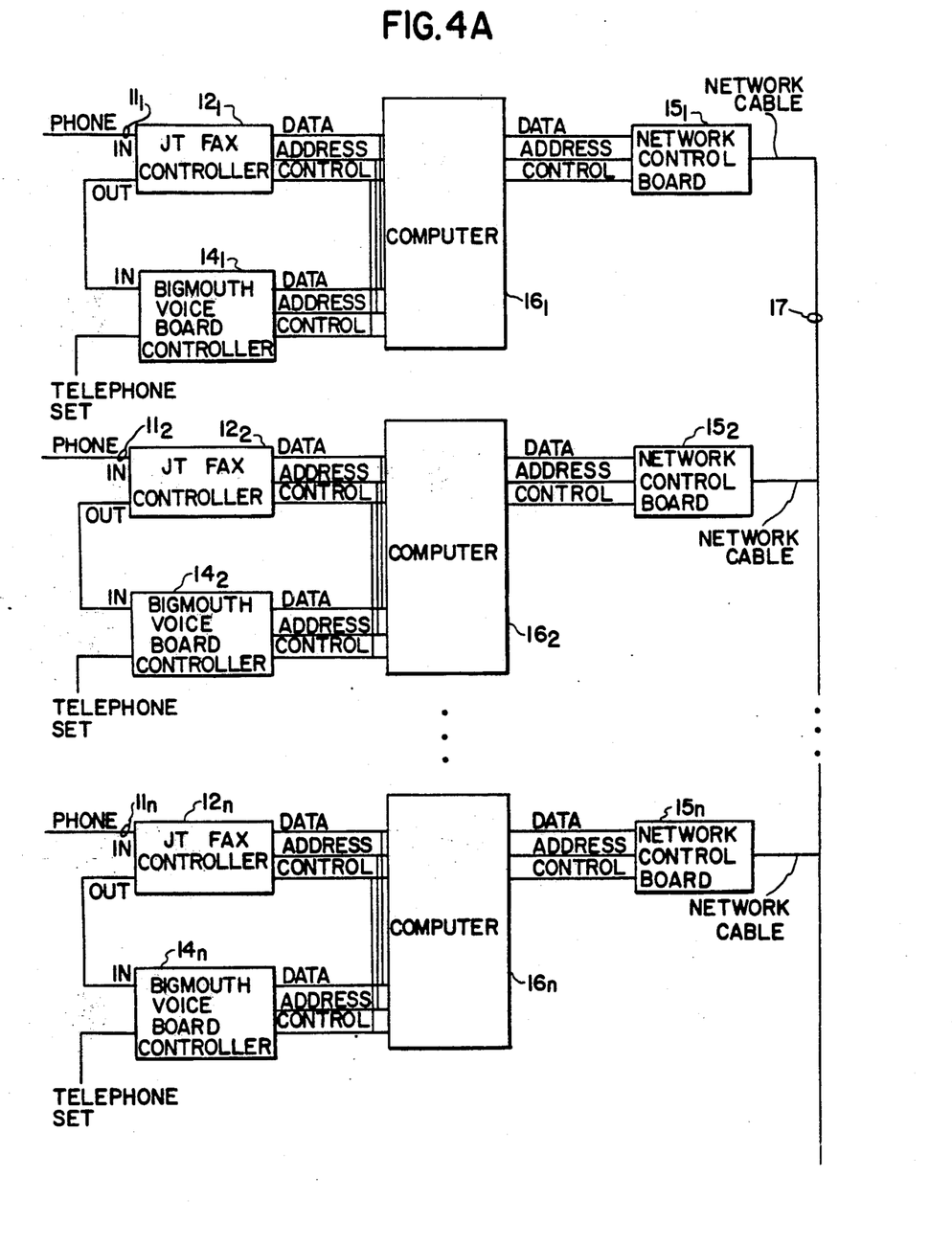
FIGS. 4A and 4B are respectively an alternative embodiment of the image storage control system particularly adapted to be coupled to a plurality of telephone lines and including a network control associated with the plural lines for transmitting data request messages to, and for receiving the accessed image data from, a hard disk memory over a local area network (LAN), and a hard disk server system including a network control coupled to the LAN and a computer for controlling the application of data request messages to, and for receiving the requested image data from, the hard disk memory.
Figure 4B:
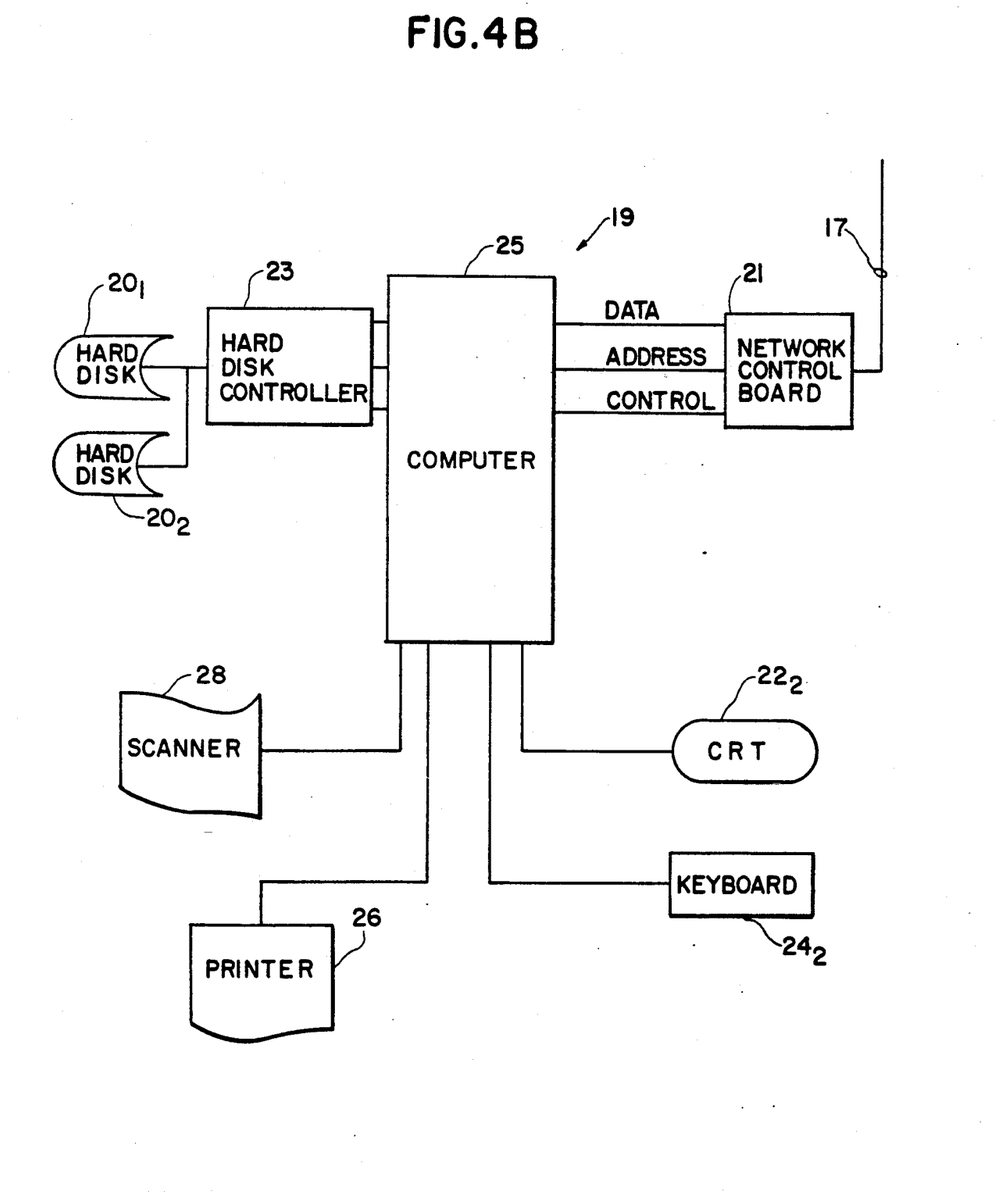

In FIG. 4A, there is shown a further embodiment of this invention in the form of an image data distribution system 10' capable of servicing a plurality of telephone line $11_1$, $11_2$-$11_N$. Each telephone line 11 is associated with a facsimile board 12 and a voice board 14 in the same fashion as shown and described with respect to FIG. 1. Each set of the facsimile board 12 and voice board 14 is coupled to its own computer 16, which is in turn coupled with a network control board 15. The board 15 is coupled via a local area network (LAN) 17 to a server system 19, as shown in FIG. 4B. In an illustrative embodiment of this invention, the network control board 15 associated with each of the computers 16 may take the form of that board manufactured by Western Digital under their designation Ethercard. Each of the computers $16_1$, $16_2$-$16_n$ is loaded with a program similar to that shown in FIGS. 2A and 2B. The primary difference between the embodiments of FIG. 4 and FIG. 2 is that the interconnection between each computer 16 of FIG. 4A and its memory 20 is made by the network control board 15 and the LAN 17.

Referring now to FIG. 4B, the LAN 17 is coupled to the hard disk server system 19, which includes a network control board 21 providing an input via the LAN 17 from each of the network control boards $15_1$, $15_2$-$15_n$. The network control board 21 is coupled to a computer illustratively taking the form of an IBM Personal Computer 25, which executes that program shown in FIGS. 7A and 7B to perform multiplexing operations between each of the telephone lines $11_1$, $11_2$-$11_n$ and a single memory comprising hard disk memories $20_1$ and $20_2$. As illustrated in FIG. 4B, the computer 25 is coupled to the hard disk memories $20_1$ and $20_2$ via a hard disk control board 23.

Figure 5A:
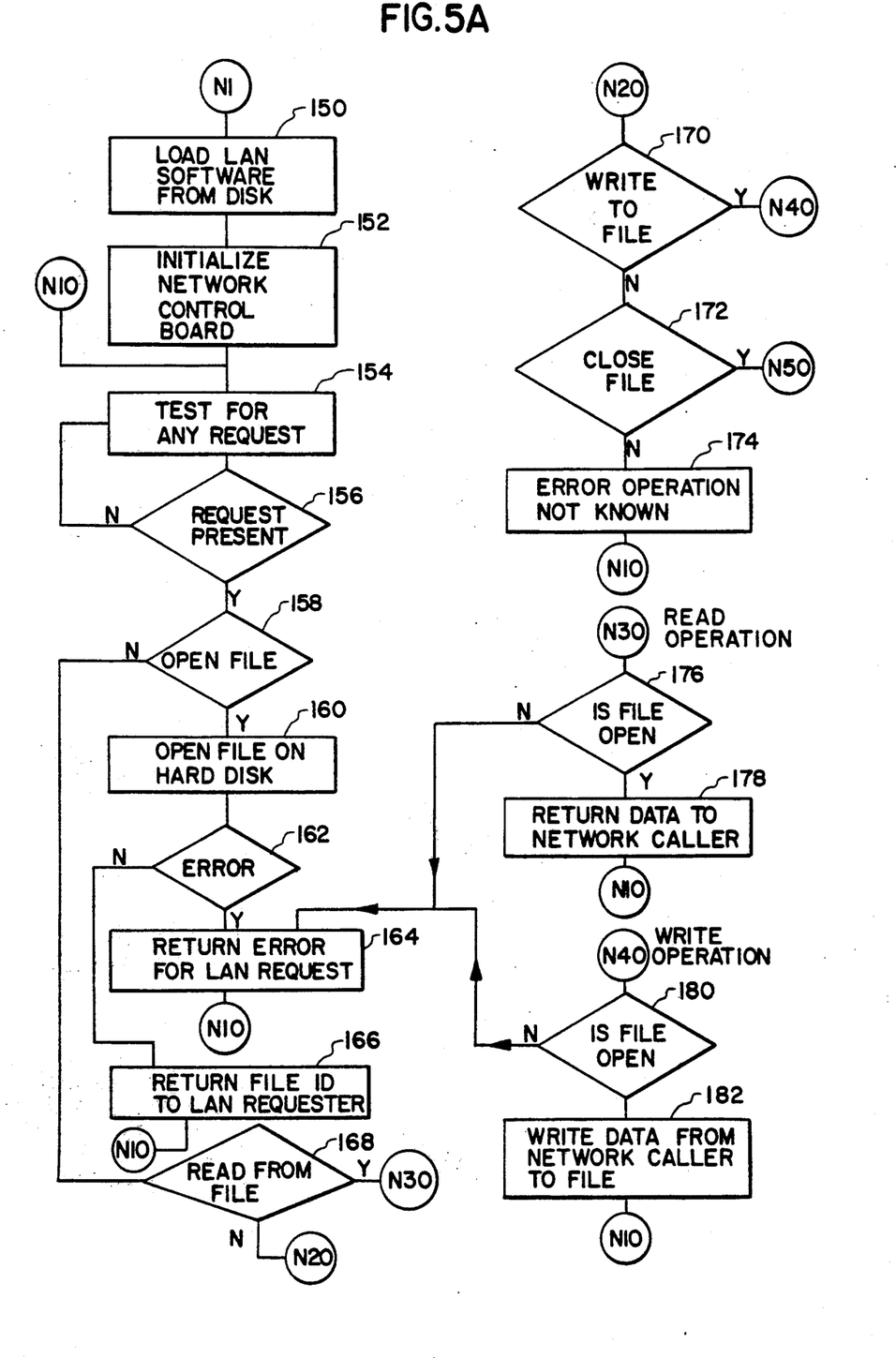
FIGS. 5A and 5B show the programs executed by the computer comprising the hard disk server system as shown in FIG. 4B.
Figure 5B:
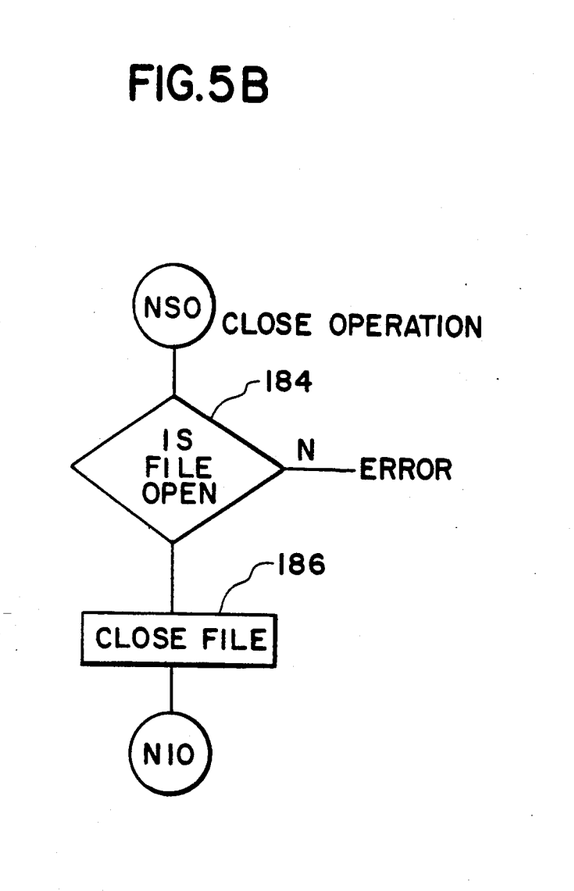

Referring now to FIG. 5A, there is shown a program stored within the RAM of the computer 25, that is executed to control the interchange of information between any of the telephone lines $11_1$, $11_2$-$11_n$, as shown in FIG. 4A, and the hard disk memories $20_1$ and $20_2$, as shown in FIG. 4B. After entering through $N_1$, step 150 loads the program as shown in FIGS. 5A an 5B into the RAM of the computer 25. Thereafter, step 152 actuates the network control board 21 for the exchange of data via the LAN with each of the computers $16_1$, $16_2$-$16_n$. Thereafter, step 154 loops, waiting for the next request message to be received from any of the computers $16_1$, $16_2$-$16_n$ via the LAN 17. Step 156 detects the presence of a data request message as transmitted over any of the telephone lines $11_1$, $11_2$-$11_n$. Upon detection of a data request message, step 158 decodes the data request message and compares the requested document to a file of available documents as stored in the hard disk memories $20_1$ and $20_2$. If the document is available, step 160 gives that document a name and opens an area in the RAM of the computer 25 to receive image data from the hard disk memories $20_1$ and $20_2$. It is contemplated that the data request message appearing upon the LAN 17 may contain an instruction to open a file in the hard disk memory 20, to write or store image data in an opened file, or to read data from the opened file. Next, step 158 determines whether the message inputted to the network control board 21 via the LAN 17, is an "open file" instruction. If so, step 160 opens the designated file in the hard disk memory 20 and gives that file a name according to that contained in the request message, thus preparing the opened file for a further operation. Next, step 162 determines whether the file was successfully opened. It is contemplated that a file could not be opened if the hard disk memory 20 was otherwise full, the requested file was restricted, or there was a hardware malfunction. If the file has not been successfully opened as determined by step 162, step 164 transmits a message indicating the status of the designated file as being closed and thus nor available to store or read out image data, via the LAN 17 to the requesting one of the plurality of computers $16_1$, $16_2$-$16_n$, before returning to step 154 to wait for the next requesting message appearing upon the LAN 17. On the other hand, if the requested file has been opened, the program moves to step 166, which transmits the name or ID of the opened file in the hard disk memory 20 to the requesting computer 16.

If a file has not already been opened in the hard disk memory $20_1$ or $20_2$ as determined in step 158, then the program moves to step 168, which determines whether the received message is to retrieve data from or to store data into the memory $20_1$ or $20_2$. If a document is to be retrieved from the hard disk memory $20_1$ or $20_2$, the program moves to step 176, which determines whether a file has been opened in the hard disk memory 20 for the named document. If the requested file has been opened in the hard disk memory 20, step 178 reads out that image data in the opened file and transmits the requested data via the LAN 17 back to the requesting computer 16, which operates as explained above to transmit the requested image data or document back over its telephone line 11 to the data requestor. After step 178, the program returns to step 154 to await the next data request message appearing upon the LAN 17.

If step 168 determines that the data request message was to store image data into the addressable hard disk memory 20, the program moves to step 170, which determines whether the message was an instruction to "write" or store data to the hard disk memory 20. If the request message was a "write" instruction as determined by step 170, the program moves to step 180, which determines whether a file for the document to be stored, has been opened. If opened, step 182 "writes" or stores the image data transmitted over a telephone line 11 in the open file of the hard disk memory 20, before returning to step 154 to wait for the next message appearing upon the LAN 17.

If step 170 determines that the data request message is not a "write to file" instruction, step 172 determines whether the message is a "close file" instruction. If not, step 174 sets the status of the requested file to indicate that the image data distribution system 10 has not been programmed to handle that operation or instruction, before returning to step 154 to wait for the next message appearing upon the LAN 17. If the message is a "close file" instruction as determine by step 172, the program moves to step 184 shown in FIG. 5B, which determines whether the identified file is open and, if not, the program returns to step 164, which transmits an error message via the LAN 17 to the originating computer 16. If the file has been opened as determined by step 184, step 186 closes that file before returning to step 154 to wait for the next data request message appearing upon the LAN 17.

If either of steps 176 or 180 determines that a file has not been opened within the hard disk memories $20_1$ and $20_2$ for the named document, there is an indication of error, and the program returns to step 164, which transmits an error message back via the LAN 17 to the originating computer 16.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

We claim:

1. Apparatus for distributing image data borne on a selected one of a plurality of documents in response to a data request message identifying said selected one document, said data request message comprising a sequence of multifrequency audible tones indicative of said selected one document, said data request message transmitted by a data requestor over a bi-directional transmission medium to said distributing apparatus, said distributing apparatus comprising:
    (a) addressable memory means for storing said plurality of documents;
    (b) receiving means for receiving said data request message over said transmission medium and for providing address signals corresponding to said selected one document to said memory means to read out document image signals from said memory means corresponding to said selected one document;
    (c) transmitting means connected to said memory means to receive said document image signals for generating and transmitting over said transmission medium to said data requestor a return message bearing said image data of said selected one document; and
    (d) means responsive to the presence of said data request message on said transmission medium for seizing said transmission medium continuously during the operation of both of said receiving means and said transmitting means, whereby said return message may be transmitted to said data requestor over said same transmission medium as transmitted said request message to said distributing apparatus.

2. The distributing apparatus as claimed in claim 1, wherein said memory means further stores message signals indicative of each of a plurality of audible messages, said receiving means comprising means responsive to a selected one of said message signals for generating and transmitting a corresponding audible message over said transmission medium to said data requestor.

3. The distributing apparatus as claimed in claim 2, wherein said plurality of audible messages includes an audible prompt directing the data requestor to formulate said data request message, and said seizing means upon seizing said transmission medium accesses said memory means to read out and apply said message signals to said transmitting means for generating and transmitting said audible prompt over said transmission medium to said data requestor.

4. The distributing apparatus as claimed in claim 1, wherein said memory means stores message signals indicative of an audible message identifying each of said plurality of documents.

5. Apparatus for distributing image data borne on a selected one of a plurality of documents in response to a data request message identifying said selected one document, said data request message comprising a sequence of multifrequency audible tones indicative of said selected one document, said data request message transmitted by a data requestor over a bi-directional transmission medium to said distributing apparatus, said distributing apparatus comprising:
    (a) addressable memory means for storing said plurality of documents;
    (b) receiving means for receiving said data request message over said transmission medium and for providing address signals corresponding to said selected one document to said memory means to read out document image signals from said memory means corresponding to said selected one document;
    (c) transmitting means connected to said memory means to receive said document image signals for generating and transmitting over said transmission medium to said data requestor a return message bearing said image data of said selected one document; and
    (d) means responsive to the presence of said data request message on said transmission medium for seizing said transmission medium continuously during operation of both of said receiving means and said transmitting means, whereby said return message may be transmitted to said data requestor over said same transmission medium as transmitted said request message to said distributing apparatus, wherein there is included means for receiving from said transmission medium image data corresponding to a new document and converting said image data into corresponding new document signals to be stored in said memory means.

6. The distributing apparatus as claimed in claim 5, wherein said receiving means receives from said transmission medium a document store message identifying said new document for opening a file within said memory means dedicated to said new document, said transmitting means comprising means for converting said new document image data into said new document signals to be stored in said opened file.

7. Apparatus for distributing image data borne on a selected one of a plurality of documents in response to a data request message identifying said selected one document, said data request message transmitted by a data requestor over a bi-directional transmission medium to said distributing apparatus, said data request message comprising a sequence of multifrequency audible tones indicative of said selected one document, said image data of said selected one document being transmitted over said transmission medium in the form of a return message, said distributing apparatus comprising:

(a) addressable memory means for storing said plurality of documents;

(b) audible data processing means comprising means for receiving and converting said audible tones of said data request message into address signals to be applied to said memory means to read out document image signals from said memory means corresponding to said selected one document;

(c) image data processing means comprising means connected to said memory means to receive said document image signals for generating said return message comprising said image data corresponding to said selected one document;

(d) said audible signal processing means and said image data processing means comprising respectively first and second actuable means for seizing said transmission medium; and (e) control means responsive to a command message transmitted over said transmission medium by said data requestor indicating that said data requestor is prepared to receive said return message, for first actuating said second seizing means for coupling said image data processing means to said transmission medium before deactuating said first seizing means to disconnect said audible data processing means from said transmission medium, whereby said return message may be transmitted to the data requestor over said same transmission medium over which said data request message was transmitted to said distributing apparatus.

8. The data distributing apparatus as claimed in claim 7, wherein said memory means stores prompt signals indicative of each of a plurality of audible prompts, said control means comprising means for addressing said memory means to read out and to apply said prompt signals of a selected one prompt to said audible data processing means for generating and transmitting said audible prompt over said transmission medium to said data requestor.

9. The data distributing apparatus as claimed in claim 8, wherein one of said plurality of prompts stored in said memory means prompts said data requestor to enter said data request message, said control means comprising means responsive to said first seizing means seizing said transmission medium to access said memory means and for generating and transmitting over said transmission medium said enter message prompt to said data requestor.

10. The data distributing apparatus as claimed in claim 7, wherein said memory means stores for each document of said plurality of document signals indicative of an audible document message describing said corresponding document.

11. The data distributing apparatus as claimed in claim 10, wherein said control means responds to the receipt of said data request message for accessing said memory means to read out said document signals and actuating said audible signal processing means to convert said document signals into said audible document message.

12. The data distributing apparatus as claimed in claim 7, wherein said image data processing means comprises means for converting image data indicative of a document transmitted over said transmission medium to said distributing apparatus into image signals to be stored in said memory means.

13. The data distributing apparatus as claimed in claim 12, wherein said audible data processing means comprises means for receiving and converting a store command comprised of said audible tones into a store signal, said control means responsive to said store signal for storing said image signals of said given document in said memory means.

14. The data distributing apparatus as claimed in claim 13, wherein said audible data converting means is responsive to a file preparation command of said audible tones transmitted over said transmission medium to provide a file signal, said control means responsive to said file signal for preparing a file in said memory means to receive said image signals indicative of said given document.

15. The data distributing apparatus as claimed in claim 7, wherein request messages are transmitted over a plurality of transmission media to said distributing apparatus, wherein there is included for each of said plurality of transmission media said audible data processing means, said image data processing means and said control means, and there is further included local transmission means and local transmission control means for controlling the transmission via said local transmission means of said address signals from said audible data processing means to said addressable memory means and said document image signals from said addressable memory means to said image data processing means associated with each of said transmission media.

16. A method of distributing over a bidirectional transmission medium from a depository of a plurality of documents, image data taken from a selected one of said plurality of documents in response to a data request message identifying said selected one document, said data request message comprising a sequence of multifrequency audible tones indicative of said selected one document, said plurality of documents stored in an addressable memory, said image data of said selected document being transmitted as a return message to said data requestor, said method comprising the steps of:

(a) establishing a communication link by seizing said transmission medium in response to the presence of said data request message on said transmission medium;

(b) interpreting said data request message to identify said selected one document and addressing said memory to provide document image signals corresponding to said image data of said selected one document;

(c) converting said document image signals into said return message bearing said image data of said selected one document and transmitting said return message over said seized transmission medium during said communication link established during said step (a) to said data requestor; and (d) after transmitting said return message, releasing said transmission medium, whereby both said request message and said return message are transmitted during said same communication link.

17. The method of distributing as claimed in claim 16, further comprising the step of, after seizing said transmission medium, transmitting an audible message prompting said data requestor to transmit said data request message.

18. The method of distributing as claimed in claim 16, wherein the addressable memory stores a plurality of audible messages identifying corresponding of said plurality of documents, said interpreting step further addressing said memory to provide audible signals of said audible message corresponding to said selected one document and transmitting said addressed audible message over said transmission medium to said data requestor.

19. A method of distributing over a bi-directional transmission medium from a depository of a plurality of documents, image data taken from a selected one of said plurality of documents in response to a data request message identifying said selected one document, said data request message comprising a sequence of multifrequency audible tones indicative of said selected of document, said plurality of documents stored in an addressable memory, said image data of said selected document being transmitted as a return message to said data requestor, said method comprising the steps of:
 (a) seizing said transmission medium in response to the presence of said data request message on said transmission medium;
 (b) interpreting said data request message to identify said selected one document and addressing said memory to provide document image signals corresponding to said image data of said selected one document;
 (c) converting said document image signals into said return message bearing said image data of said selected one document and transmitting said return message over said seized transmission medium to said data requestor; and
 (d) after transmitting said return message, releasing said transmission medium, whereby both said request message and said return message are transmitted over said same seized transmission medium, wherein there is further included the step of receiving image data corresponding to a new document, converting said received image data of said new document into corresponding new document signals, and storing said new document signals in said memory means.

20. The method of distributing as claimed in claim 19, further comprising the step of receiving over said transmission medium an instruction indicating the name of the new document and opening a new file in said memory means for storing said document signals of said new document.

21. The method of distributing as claimed in claim 20, wherein there is further included the step of receiving an audible message identifying said new document, converting said audible message into corresponding message signals, and of storing said corresponding message signals in said opened file of said corresponding new document.

22. A method of distributing image data via a telephone link, said method comprising the steps of:
 (a) establishing a telephone link between a data distributing apparatus and a remote location;
 (b) transmitting a data request message from said remote location to said data distributing apparatus, said data request message comprising a sequence of multifrequency audible tones, said data request message specifying selected image data;
 (c) interpreting said data request message to identify said selected image data;
 (d) retrieving said selected image data from a memory and including said selected image data in a return message;
 (e) transmitting said return message from said data distributing apparatus to said remote location during the same telephone link established during said step (a); and
 (f) terminating said telephone link.

* * * * *